United States Patent [19]
Kamiguchi et al.

[11] Patent Number: 5,762,839
[45] Date of Patent: Jun. 9, 1998

[54] TEMPERATURE CONTROL METHOD FOR AN INJECTION MOLDING MACHINE

[75] Inventors: Masao Kamiguchi, Minamitsuru-gun; Noriaki Neko, Fujiyoshida, both of Japan

[73] Assignee: Fanuc Ltd., Yamanashi, Japan

[21] Appl. No.: 628,737

[22] PCT Filed: Aug. 29, 1995

[86] PCT No.: PCT/JP95/01712

§ 371 Date: Apr. 15, 1996

§ 102(e) Date: Apr. 15, 1996

[87] PCT Pub. No.: WO96/06719

PCT Pub. Date: Mar. 7, 1996

[30] Foreign Application Priority Data

Sep. 1, 1994 [JP] Japan .................................. 6-230224

[51] Int. Cl.$^6$ .................................................. B29C 45/78
[52] U.S. Cl. ........................ 264/40.6; 425/143; 425/144
[58] Field of Search ................................ 425/144, 143; 264/40.6

[56] References Cited

U.S. PATENT DOCUMENTS

| 5,355,938 | 10/1994 | Hosoya et al. | 425/144 |
| 5,435,711 | 7/1995 | Yamada | 425/144 |
| 5,486,105 | 1/1996 | Katsumata | 425/144 |

FOREIGN PATENT DOCUMENTS

| 49-109945 | 10/1974 | Japan . |
| 57-212502 | 12/1982 | Japan . |
| 61-115108 | 6/1986 | Japan . |
| 62-85408 | 5/1987 | Japan . |
| 62-204917 | 9/1987 | Japan . |
| 2-213911 | 8/1990 | Japan . |
| 2-126813 | 10/1990 | Japan . |

*Primary Examiner*—Tim Heitbrink
*Attorney, Agent, or Firm*—Staas & Halsey

[57] ABSTRACT

A temperature control method for an injection molding machine capable of performing stable temperature control at all times irrespective of the heat capacity of an object of temperature control. A temperature of an object of temperature control, such as a heating region of an injection cylinder, an injection nozzle and a mold, is detected by a respective temperature sensor G1-Gn. A feedback control of temperature is performed by a servo CPU (24) so that the detected temperature coincides with a set temperature, to obtain an electric current command value. Further, an actual electric current flowing in each of heaters H1-Hn is detected, and a feedback control of electric current is performed so that the actual current coincides with the current command value obtained by the temperature feedback control. Thus, stable temperature control is realized with less fluctuations of the electric current flowing in the respective heater H1-Hn and less fluctuations of the temperature of the object of temperature control in comparison with on/off control method.

5 Claims, 3 Drawing Sheets

5,762,839

TEMPERATURE CONTROL METHOD FOR AN INJECTION MOLDING MACHINE

TECHNICAL FIELD

The present invention relates to a temperature control method in injection molding using an injection molding machine.

BACKGROUND ART

In carrying out an injection molding using an injection molding machine, objects of temperature control, such as a plurality of heating regions defined by dividing a cylinder of an injection molding machine, a nozzle and a mold mounted on the injection molding machines are heated by the respective heaters such as band heaters or rod heaters. A temperature of each object of temperature control is detected by a temperature sensor such as a thermocouple and a feedback control of temperature is performed so that the detected temperature coincides with a set temperature. In the conventional art, the temperature control is accomplished by an on/off control. That is, the temperature of each object of temperature control is controlled by adjusting the calorific value generated by the heater per unit time, which is realized by manipulating a turn-on time during which the fixed electric current is supplied to the heater and a turn-off time during which no electric current is supplied to the heater.

In the conventional temperature control method, as the on/off control is employed in which the ratio between the turn-on time for supplying the fixed electric current to the heater and the turn-off time for pausing the electric current to the heater is controlled, the value of the electric current flowing in the heater fluctuates largely and therefore the calorific value generated by the heater fluctuates largely. In the case where the heat capacity of the object of temperature control such as a cylinder and a nozzle is relatively large, a large fluctuation of the calorific value of the heater would give a small influence on change of temperature of the object of temperature control to cause no problem. In the case where the heat capacity of the object of temperature control is relatively small, however, the temperature of the object of temperature control would vary largely in response to a change of the calorific value generated by the heater, thereby causing a problem such that stable temperature control is not realized.

SUMMARY OF THE INVENTION

An object of the present invention is to provide a temperature control method for an injection molding machine capable of performing stable temperature control at all times, irrespective of heat capacity of an object of temperature control.

According to the present invention, a temperature of an object of temperature control, such as a heating region of an injection cylinder, an injection nozzle or a mold, is detected and a feedback control is performed to obtain a command value of an electric current to be supplied to the heater so that the detected temperature coincides with a set value. Based on the obtained command value, the temperature of the object of temperature control is controlled by manipulating the value of the current to be supplied to the heater. When the detected temperature is lower than the set value, the electric current command value increases to raise the electric current flowing in the heater, so that the calorific value generated by the heater increases to cause a rise of temperature of the object of temperature control. Contrarily, when the detected temperature is higher than the set value, the electric current command value decreases to reduce the electric current flowing in the heater, so that the calorific value generated by the heater decreases to cause a drop of the temperature of the object of temperature control. As a result, the temperature of the object of temperature control is kept at the set value.

Further, an actual current flowing in the heater is detected and a feedback control of electric current is performed so that the detected actual current coincides with the command value obtained by the temperature feedback control in order to control the temperature of the object of temperature control more accurately.

BEST MODE FOR CARRYING OUT THE INVENTION

Figure 1:
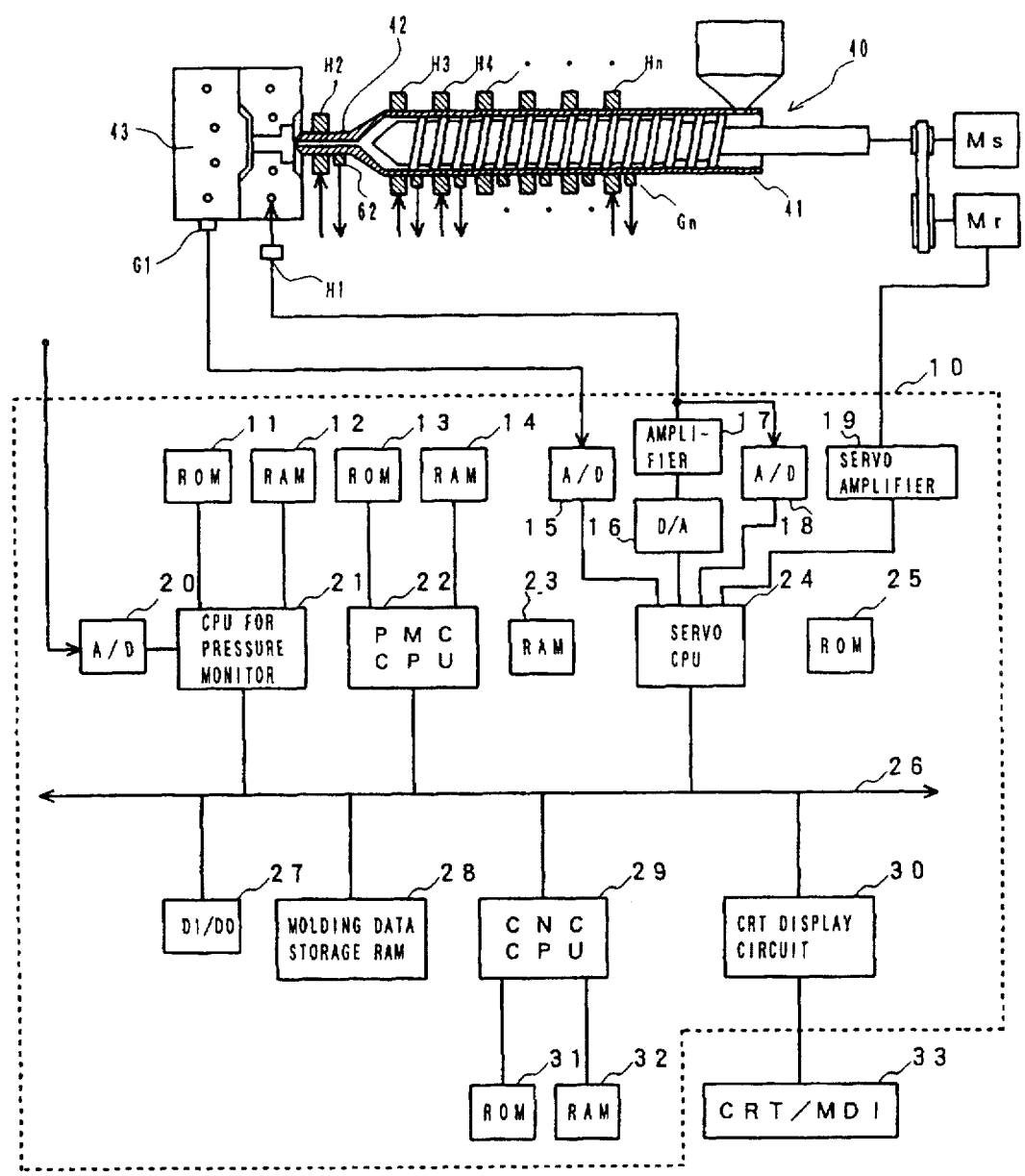
FIG. 1 is a block diagram of a control apparatus of an injection molding machine for carrying out the method of the present invention.

In an embodiment of the present invention as shown in FIG. 1, an injection molding machine 40 is drivingly controlled by a numerical control device 10. The numerical control device 10 comprises a CPU 29 for CNC as a microprocessor for numerical control, a CPU 22 for PMC as a microprocessor for programmable machine control, a servo CPU 24 as a microprocessor for servo control, and a CPU 21 for a pressure monitor. The numerical control device 10 transmits information among the respective microprocessors by selecting their respective inputs/outputs via a bus 26. The pressure monitor CPU 21 is a microprocessor for executing sampling of an injection dwell pressure and an back pressure of an injection screw via an A/D converter 20 and a pressure detector (not shown) provided on the screw.

The PMC CPU 22 is connected to a ROM 13 which stores a sequence program for controlling a sequential operation of the injection molding machine and to a RAM 14 for temporary storage of arithmetic data. The CNC CPU 29 is connected to a ROM 31 which stores a program for generally controlling the injection molding machine and to a RAM 32 for temporary storage of arithmetic data.

Further, the servo CPU 24 is connected to a ROM 25 which stores a control program dedicated for servo control and to a RAM 23 for temporary storage of data.

The pressure monitor CPU 21 is connected to a ROM 11 which stores a control program relating to the aforementioned sampling processing of the pressure data and to a RAM 12 for temporarily storage of data. Still further, the servo CPU 24 is connected to a servo amplifier 19 for driving servo motors of the respective shafts for clamping, injection, screw rotation and ejecting, based on the commands from the CPU 24. In FIG. 1, only the servo amplifier connected to the servo motor Mr for screw rotation is shown. Outputs of pulse coders (not shown), each associated with the servo motor for the respective shaft, are fed back to the servo CPU 24, and the position and speed are controlled by the servo CPU 24 based on the feedback pulses from the pulse coders.

An interface 27 connected to the bus 26 is an input/output interface for receiving signals from an operation panel and limit switches arranged at various parts of the injection molding machine, and for transmitting various commands to peripheral equipments of the injection molding machine. A manual data input device with a display (CRT/MDI) 33 is connected to bus 26 via CRT display circuit 30 and provided with numeral keys for inputting numerical data and various function keys for selecting monitor display pictures and a function menu. A nonvolatile memory 28 is a molding data storage memory which stores molding conditions for an injection molding operation (e.g., injection dwell pressure condition, measuring and kneading condition and set temperatures for various objects of temperature control), various set values, parameters, macro variables, etc. This memory 28 is also connected to the bus 26.

An injection cylinder 41 is divided into a plurality of regions to be heated and heaters H2-Hn (such as band heaters and rod heaters) are provided on an injection nozzle 42 for heating the injection nozzle 42 and on the individual heating regions of the injection cylinder 41 for heating the injection cylinder 41. Also a heater Hi is mounted on a mold 43 for heating the mold 43 by circulating a heating medium in a flow passage formed in the mold 43. In this embodiment, a power amplifier 17 is connected to the servo CPU 24 via a D/A converter 16 for converting digital signals into analog signals and the power amplifier 17 controls electric currents flowing in the heaters H1-Hn for heating the respective objects of temperature control (the individual heating regions of the injection cylinder, the injection nozzle and the mold).

Temperature sensors G2-Gn are arranged at the injection nozzle 42 and the individual heating regions of the injection cylinder 41 for detecting temperatures of the injection nozzle 42 and the individual heating regions of the injection cylinder 41, and a temperature sensor G1 is arranged at the mold 43 for detecting a temperature of the mold 43. The respective outputs of temperature sensors G1-Gn are inputted to an A/D converter 15, and the A/D converter 15 converts analog signals from the individual temperature sensors G1-Gn into digital signals to output them to the servo CPU 24. Further, the output of the power amplifier 17 which represents an actual electric current of the respective heaters H1-Hn is detected by a current detector (not shown) and outputted to the servo CPU 24 via an A/D converter 18. The D/A converter 16, the power amplifier 17 and the A/D converters 15, 18 are provided for each object of temperature control (each region of the cylinder, the nozzle and the mold). In FIG. 1, however, only the D/A converter, the power amplifier and the A/D converter which are connected to the heater Hi and temperature sensor G1 for the mold 43 are illustrated.

With the arrangement described above, the PMC CPU 22 performs a sequence control of the whole injection molding machine, while the CNC CPU 29 performs pulse distribution to the servo motors for the individual shafts, based on the control program of the ROM 31. The servo CPU 24 performs a position loop control, a speed loop control and a current loop control based on move commands which are pulse-distributed for the individual shafts and also position and speed feedback signals detected by detectors such as pulse coders, in the same manner as in the conventional art. The servo CPU 24 also performs the temperature control of each temperature-controlled object in this embodiment.

Figure 2:
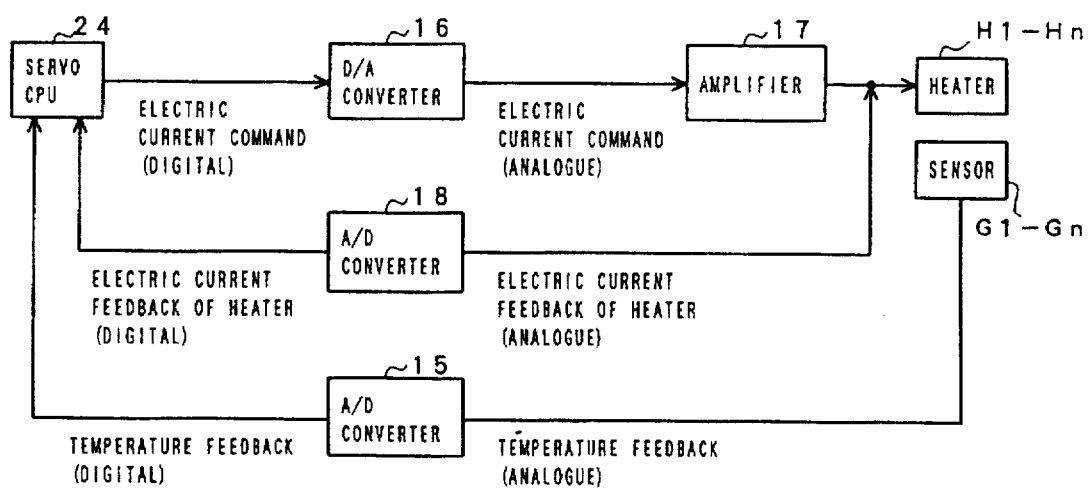
FIG. 2 is a block diagram of a portion relating to the temperature control in the control apparatus shown in FIG 1.

FIG. 2 is a block diagram showing a principal part relating to the temperature control in the control apparatus shown in FIG. 1. Set temperatures Ti-Tn for the individual objects of temperature control (the individual heating regions of the injection cylinder 41, the injection nozzle 42 and the mold 43) are stored in advance in the molding data storage RAM 28 in the form of a nonvolatile memory, through the CRT/MDI 33 and the CRT display circuit 30. The servo CPU 24 reads the set temperatures and the temperature values of the objects of temperature control which are converted into digital signals by A/D converter, and executes a PID (proportional, integral and differential) control to obtain an electric current command so that each detected temperature coincides with each set temperature.

The outline of the PID control to be executed by the servo CPU 24 will be described referring to the flowchart of FIG. 3.

Figure 3:
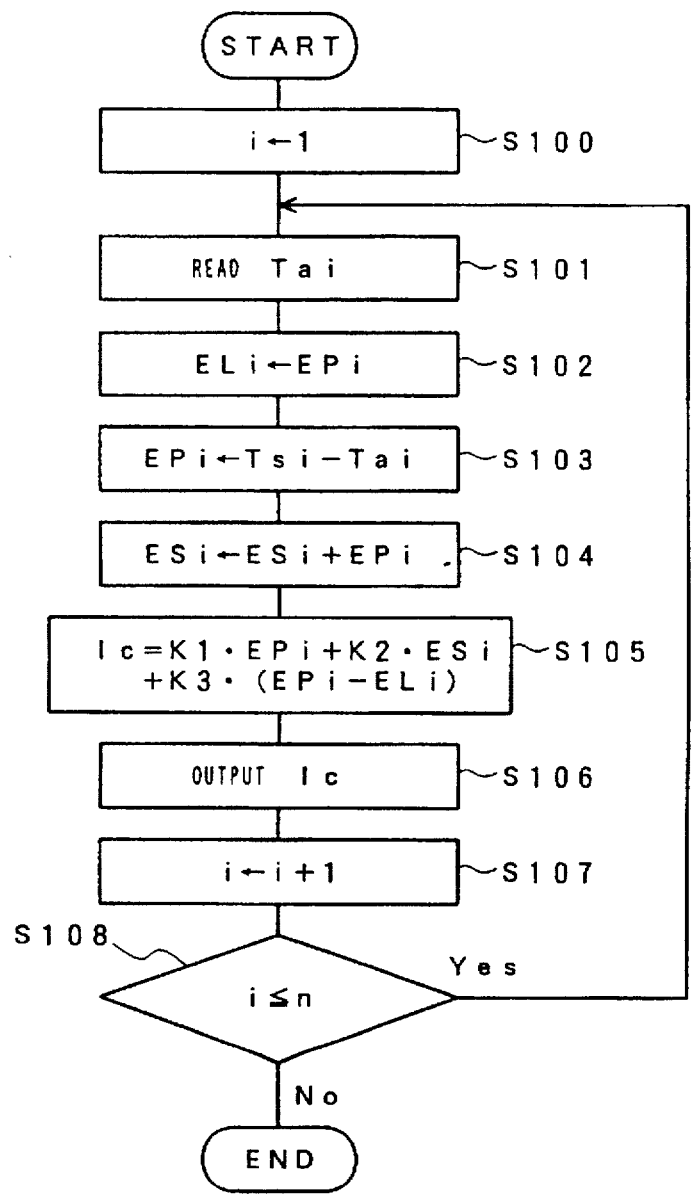
FIG. 3 is a flowchart showing PID temperature control.

The servo CPU 24 repeatedly executes the temperature control processing shown by the flowchart of FIG. 3 in every predetermined processing cycle.

First, the servo CPU 24 sets an index i to 1 (step S100) to designate and switch the A/D convertor 15 provided for each object of temperature control and then reads the detected temperature Tai inputted to a terminal i of the A/D converter 15 designated by the index i (Step S101). Subsequently, a value of a register EPi, which stores a temperature deviation of a heater corresponding to the terminal i (when i is 1, the heater is the mold heating heater H1, when i is 2, the heater is the nozzle heating heater H2 and when i is 3-n, the heater is the cylinder heating heater H3-Hn) detected at the terminal i in the previous processing cycle, is shifted to a register Eli (step S102). Then, the servo CPU 24 subtracts the detected temperature Tai read in Step S101 from the set temperature Tsi for the temperature-controlled object corresponding to terminal i (the set temperature T1 for the mold 43 when i is 1, the set temperature T2 for the nozzle 42 when i is 2, and the set temperatures T3-Tn for respective heating regions of the cylinder 41 when i is 3-n) to obtain a temperature deviation and stores it in register Epi (Step 103). The temperature deviation value stored in the register EPi is added to the register ESi for storing an integrated value of the temperature deviations (step S104). Then, an electric current command value Ic is calculated according to the following equation (1) (step S105).

$$Ic = K1 \cdot EPi + K2 \cdot ESi + K3 \cdot (EPi - ELi) \tag{1}$$

where K1, K2 and K3 respectively represent proportional, integral and differential gains for the temperature control, and EPi, ESi and ELi represent values of the respective registers, which indicate a temperature deviation detected in the present processing cycle, an integrated value of the temperature deviations and a temperature deviation detected in the previously processing cycle, respectively.

The obtained current command value Ic is outputted to the power amplifier 17 for the heater at the individual heating regions of the cylinder 41, the nozzle 42 or the mold 43, which corresponds to the terminal i (step S106). Then, the servo CPU 24 proceeds to step S107 where an increment is given to the index i, and then determines whether or not the index i is less than or equal to the number n of the objects of temperature control (step S108). If the index i is less than or equal to n, the procedure returns to step S101 to repeat step S101 and the subsequent processing. The processing of steps S101-S108 are repeatedly executed until the index i exceeds n, so that the individual heaters H1-Hn heat the mold 43, the nozzle 42 and the individual heating regions of the injection cylinder 41, based on the calculated electric current command values.

The servo CPU 24 repeats the foregoing processing for every processing cycle to heat the individual objects of temperature control by the respective heaters H1-Hn and performs the PID (proportion, integration and differential) control so that the temperatures of the individual objects coincide with the respective set values.

An actual electric current flowing in the heater H1-Hn, which is identical with the output of the current amplifier 17, is detected by the current detector and converted into a digital signal by the A/D converter 18. The servo CPU 24 reads the actual electric current and performs the PI (proportion and integration) or the PID (proportion, integration and differential) control, based on the actual electric current value (digital quantity) and the electric current command value Ic to obtain feedback-controlled electric current command value to the heater. Thus, the servo CPU 24 also performs an electric current feedback control by employing the actual electric current as a controlled variable. This electric current command value is converted into an analog signal by the D/A converter 16 and the analog electric current command value is amplified by the power amplifier 17 to supply to the heater H1-Hn. The power amplifier 17 may be an ordinary amplifier for amplifying electric power or a power amplifier for performing PWM (pulse width modulation) control.

As described above, the temperature feedback control is performed and the electric current feedback control is also performed using the electric current command value obtained by the temperature feedback control as a set value. Thus, even if the electric resistance of the heaters varies due to the rise of temperature, the temperatures of the respective objects of temperature control, i.e. the individual region of the injection cylinder, the injection nozzle and the mold, are stably controlled to coincide with the respective set values.

In the foregoing embodiment, temperature control is performed by the servo CPU 24, however, it may be performed by any other processor (the pressure monitor CPU, the PMC CPU or the CNC CPU). In another alternative manner, the detected temperature of the heater may be fed back to a processor other than the servo CPU so that the processor performs the electric current feedback control to obtain the electric current command, and the obtained electric current command may be outputted to the servo CPU to perform the electric current feedback control for controlling an electric current for the heater.

Further, the temperature control and the electric current control may be performed by a dedicated control circuit instead of the processor. For example, a temperature controller for performing the PID control and an electric current controller for performing the PI or PID control of the electric current may be provided and the detected value from the temperature sensor may be fed back to the temperature controller. Further, the electric current of the heater may be controlled by performing the feedback control by the electric current controller based on the electric current command value obtained by the temperature controller and a feedback value of the actual electric current detected by the current detector, so that the temperature of the object of temperature control is controlled.

According to the present invention, as the value of an electric current flowing in the heater is directly controlled, the temperature fluctuation is smaller than that in the case where the duration of electric current supply to heater is controlled by on/off operation, thereby enabling more stable temperature control. Further, since the amplifier performs switching operation in the case of adopting the PWM control, a considerable amount of electric power can be saved in comparison with the case without adopting the PWM control. Furthermore, even when the electric resistance of the heater varies due to the rise of the temperature, the value of the electric current to be supplied to the heater is controlled to the target value to provide a stable temperature control by feedback controlling the electric current flowing in the heater.

We claim:

1. A temperature control method for an injection molding machine having a heater for heating an object said object having a controlled temperature said method comprising the steps of:

(a) detecting the temperature of said object;

(b) determining a command value of an electric current to be supplied to said heater by executing a feedback control so that said temperature detected in said step (a) coincides with a set value;

(c) controlling the temperature of said object by manipulating the electric current to be supplied to the heater based on said command value obtained in said step (b);

(d) detecting an actual electric current flowing in the heater; and (e) executing a feedback control so that said actual electric current detected in said step (d) coincides with said command value obtained in said step (b).

2. A temperature control method for an injection molding machine according to claim 1, said step (c) including a step of pulse width modulation (PWM) controlling the electric current supplied to said heater.

3. A temperature control method for an injection molding machine according to claim 1, said step (c) including a step of pulse width modulation (PWM) controlling the electric current to be supplied to said heater.

4. A temperature control method for an injection molding machine according to claim 1, said object of temperature control including a heating region of an injection cylinder, an injection nozzle and a injection mold.

5. A temperature control method for an injection molding machine having a heater for heating an object whose temperature is being controlled, said method comprising the steps of:

detecting a temperature of the object;

calculating an electric current command value Ic, according to the following equation (1):

$$Ic = K1 \cdot EPi + K2 \cdot ESi + K3 \cdot (EPi - ELi) \tag{1}$$

where K1, K2, and K3 respectively represent proportional, integral, and differential gains for temperature control, and EPi, ESi, and ELi represent values of respective registers, which indicate a temperature deviation detected in a present processing cycle; and controlling the temperature of said object by manipulating the electric current to be supplied to the heater based on said command value.

* * * * *

UNITED STATES PATENT AND TRADEMARK OFFICE
CERTIFICATE OF CORRECTION

PATENT NO. : 5,762,839

DATED : June 9, 1998

INVENTOR(S) : Kamiguchi et al.

It is certified that error appears in the above-indentified patent and that said Letters Patent is hereby corrected as shown below:

Col. 1, line 15, "machines" should be --machine,--.

Col. 2, line 52, after "data." continue paragraph with line 53 (NO NEW PARAGRAPH);
line 55, "temporarily" should be --temporary--.

Col. 3, line 20, "Hi" should be --H1--;
line 49, "Hi" should be --H1--.

Col. 6, line 12, "object" should be --object,--;
line 13, "temperature" should be --temperature,--;

line 46, "value" should be --value,--.

Signed and Sealed this

Second Day of March, 1999

Attest:

Q. TODD DICKINSON

*Attesting Officer*     *Acting Commissioner of Patents and Trademarks*